United States Patent [19]

Truax et al.

[11] 4,206,580
[45] Jun. 10, 1980

[54] MOWER DEVICE

[76] Inventors: Clarence E. Truax, 3918 Farmview Ave., Louisville, Ky. 40202; Michael E. Tuskos, 5719 W. Highway 22, Crestwood, Ky. 40014

[21] Appl. No.: 932,911

[22] Filed: Aug. 11, 1978

Related U.S. Application Data

[63] Continuation-in-part of Ser. No. 856,277, Dec. 1, 1977, abandoned.

[51] Int. Cl.$^2$ ............................................. A01D 75/18
[52] U.S. Cl. ...................................... 56/10.4; 56/11.9; 56/16.2
[58] Field of Search ................. 56/10.4, 11.9, 14.7, 56/14.9, 15.5, 15.7, 15.8, 15.9

[56] References Cited

U.S. PATENT DOCUMENTS

| 2,601,366 | 6/1952 | Chapman | 56/15.5 |
|---|---|---|---|
| 2,662,561 | 12/1953 | Duncan, Jr. | 56/15.9 |
| 2,699,635 | 1/1955 | Burton | 56/15.7 |
| 2,840,974 | 7/1958 | Dunn et al. | 56/10.4 |
| 2,997,835 | 8/1961 | Stewart | 56/11.9 |
| 3,003,299 | 10/1961 | Smith et al. | 56/10.4 |
| 3,061,996 | 11/1962 | Ripps | 56/11.9 |
| 3,274,762 | 9/1966 | Jolls | 56/11.9 |
| 3,319,407 | 5/1967 | Jordan et al. | 56/11.9 |
| 3,390,515 | 7/1968 | Schaible et al. | 56/10.4 |
| 3,462,925 | 8/1969 | Lanier | 56/10.7 |
| 3,665,685 | 5/1972 | Allard | 56/11.9 |
| 3,771,296 | 11/1973 | Sorenson | 56/14.7 |
| 3,949,539 | 4/1976 | Cartner | 56/15.5 |

Primary Examiner—Russell R. Kinsey
Assistant Examiner—Paul J. Hirsch
Attorney, Agent, or Firm—Maky, Renner, Otto & Boisselle

[57] ABSTRACT

A brush mowing attachment to be secured to a tractor including a bracket assembly, for example a yoke adapted to be secured to the tractor, an extendable retractable outrigger arm arrangement connected to the yoke by pivot means located below the body of the tractor where the pivot means permits the outrigger arrangement to be selectively pivoted in a horizontal and a vertical plane, where the outrigger arrangement is adapted to carry a mower device and be selectively extended outwardly from the tractor and retracted toward the tractor, including means to selectively raise and lower the outrigger arrangement. Also, the outrigger mower device can be adapted for pivotal movement in a vertical plane.

25 Claims, 10 Drawing Figures

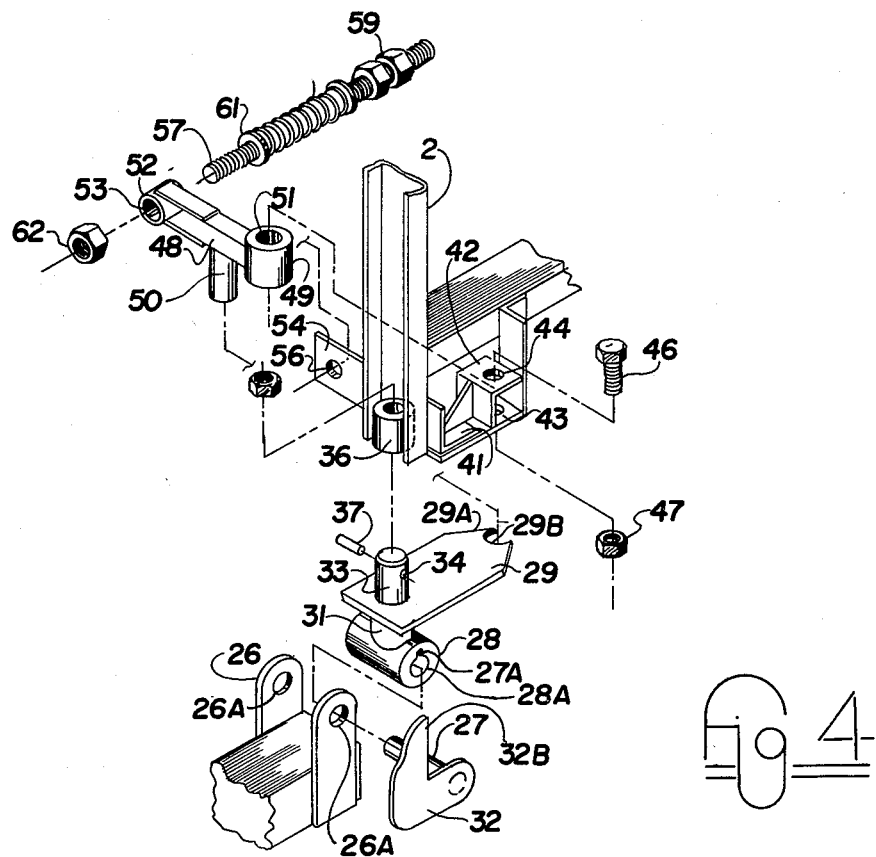
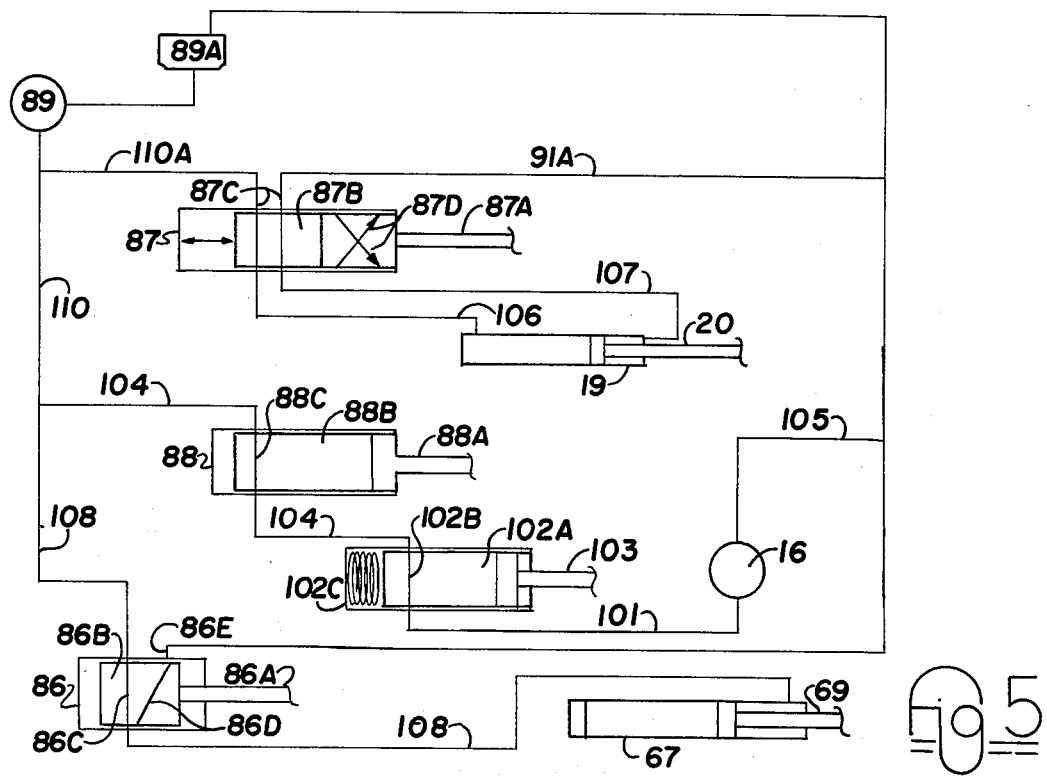

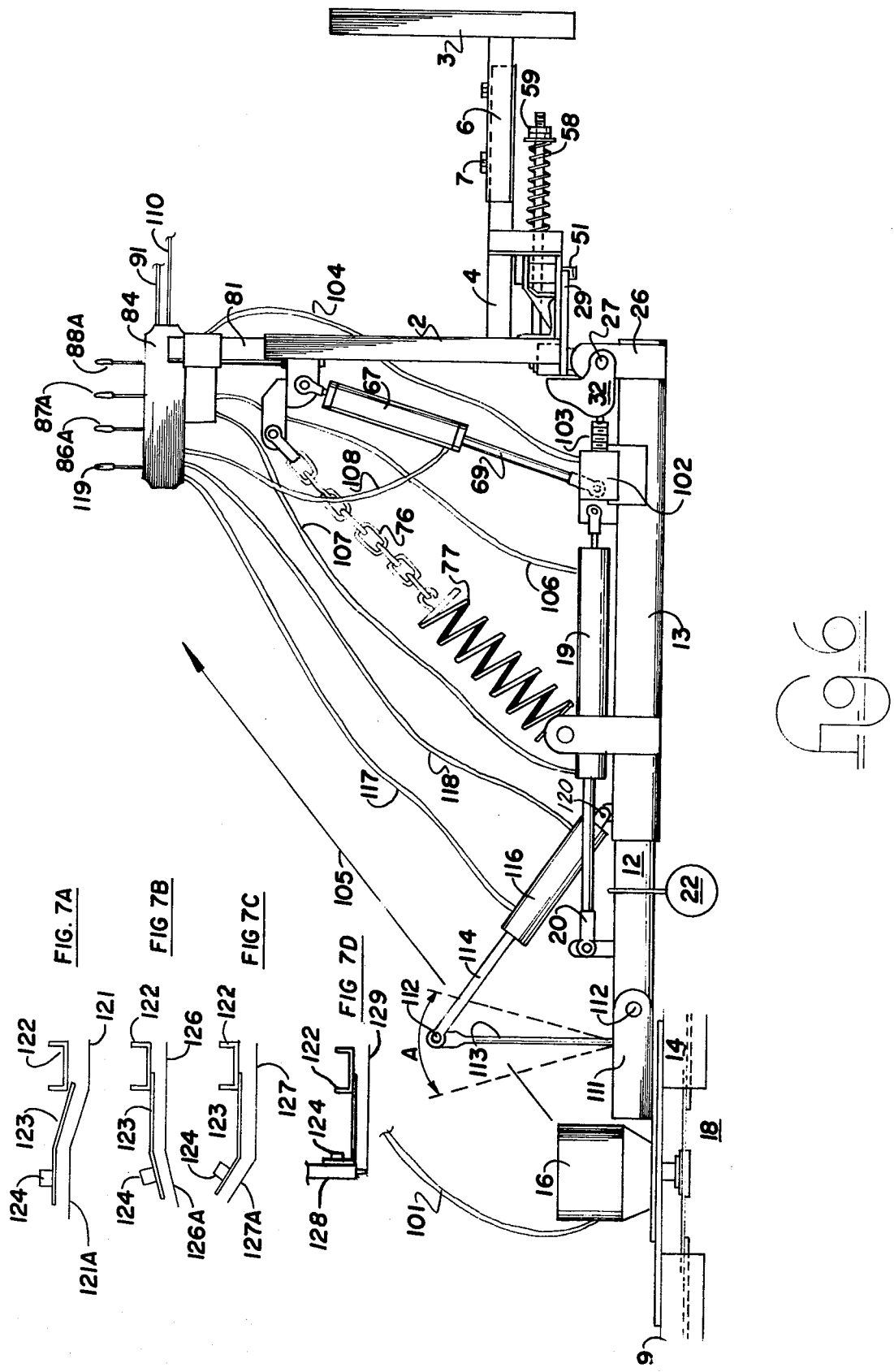

MOWER DEVICE

BACKGROUND OF THE INVENTION

The present invention relates to power-driven mower means for cutting brush, trees, vines, weeds, grass, etc. in locations inaccessible to a tractor, or mowers carried on the front or rear of such tractors, such as roadsides, ditches, steep road banks, and for cutting beneath fences and is a continuation-in-part of application Ser. No. 856,277 filed Dec. 1, 1977 now abandoned.

A most difficult problem faced by both governmental and industrial maintenance departments, as well as farmers, is cutting of grass and weeds on steeply inclined slopes, inaccessible places such as bridge approaches, around walls, railroad right-of-ways, and under fences. In many such areas, the ground slopes at an angle which makes it dangerous or inconvenient for the use of a conventional mower to operate in the areas and insofar as fence rows are concerned, particularly on farms, mowing under the fence rows with conventional handmowers is impractical.

Some prior art devices have been devised to accomplish the object of the present invention, but none include the features provided by the present invention as discussed hereinafter.

Such previous devices as shown in U.S. Pat. No. 3,045,413 Sheffer have included laterally extended mower devices where means are provided to elevate the mower device in a vertical direction. However, such devices have not provided means for pivotal movement of the mower device in a horizontal plane.

Other devices, as shown in U.S. Pat. No. 3,274,762 Jolls, have provided complicated, expensive arrangements where the mower device extends laterally from a tractor but likewise, have not provided means for pivotal movement of the mower device in a horizontal plane. In applications where a mower mounted for use on a moving tractor is utilized to trim grass along and under a fence, where it is necessary to retract the mower to avoid fence posts, or other fixed objects, such prior art arrangements have not provided means to prevent damage to the mower when it strikes such fixed objects.

Other previous arrangements have also provided extensible booms which are large heavy complicated mechanisms requiring significant maintenance expense and excessive cost in materials.

SUMMARY OF THE INVENTION

The present invention provides a straightforward, relatively inexpensive mower arrangement to be connected to a tractor to extend laterally from the tractor at a location beneath the tractor body where the device can be selectively raised or lowered, can be pivoted in a vertical plane and which also has the capability of movement in a horizontal plane when the mower encounters a fixed object. Accordingly, devices within the scope of the present invention are particularly useful in applications where it is necessary to mow around fixed objects or where the surface to be mowed is inclined relative to a horizontal plane.

More particularly, the present invention provides an arrangement which prevents damage to the mower when the mower inadvertently strikes a fixed object which has not been heretofore provided.

The present invention further provides a mower arrangement where the mower is extensible and can be simply supported on a telescoping sleeve.

Moreover, devices within the scope of the present invention can be provided with pivot means to connect the mower device to the end of the extensible retractable outrigger to selectively pivot the mower device in a vertical plane to accomodate any inclined surface to be mowed.

The construction provided by the present invention is of novel design and adapted for use with a tractor where the assembly is light-weight, employs relatively few parts, and is operated by a simple, efficient and easily repaired mechanism.

More particularly, the present invention provides a mowing arrangement to be secured to a tractor where the arrangement includes a bracket, for example a yoke to be secured to the tractor, an extensible, retractable outrigger arm to be carried by the yoke by pivot means where the outrigger arm carries a mower device adjacent the outer end thereof and where the pivot means is adapted to selectively pivot the outrigger arm in a vertical and horizontal plane and the outrigger arm is adapted to selectively extend and retract the mower device where the mower can be connected to the outrigger arm by pivot means to permit pivotal movement of the arm in a vertical plane.

These and other objects, features, and advantages of the present invention will become obvious to those skilled in the art upon the consideration of the specification, attached drawings, and appended claims.

BRIEF DESCRIPTION OF THE DRAWINGS

The figures, appended hereto, illustrate one example of a mower apparatus within the scope of the present invention, and in the figures:

FIG. 4 is an enlarged view of the pivot and release mechanism of the embodiment shown in FIG. 1;

FIG. 5 is a schematic illustration of the hydraulic circuit utilized in the embodiment shown in FIG. 1;

FIG. 6 is a perspective view of an arrangement in accordance with the present invention showing a mower device pivotably connected to an outrigger; and FIGS. 7 A–D are schematic illustrations of examples of operation of examples of devices in accordance with the present invention.

Referring to FIG. 1, an adjustable yoke assembly 1 is provided which includes upstanding channel members 2 and 3 where channel member 2 carries a laterally extending arm 4 and channel 3 carries a laterally extending channel arm 6 where channel arm 6 overlaps arm 4. Bolts 7 can be provided to secure arm 6 to arm 4 where channel 4 includes slots (FIG. 2) so that channel 6 can be adjustably moved over channel 4 to selectively adjust the distances between channels 2 and 3 of yoke assembly 1. The yoke is positioned with arms 4 and 6 beneath the body of a tractor so channels 2 and 3 are on either side of the tractor secured to the tractor by means of bolts (not shown) inserted through apertures 8 of channel 3.

The example of the present invention shown in FIG. 1 includes a mower assembly 9, described hereinafter, carried on a telescoping arm assembly including a sliding arm 12 and a receiving arm 13.

Figure 3:
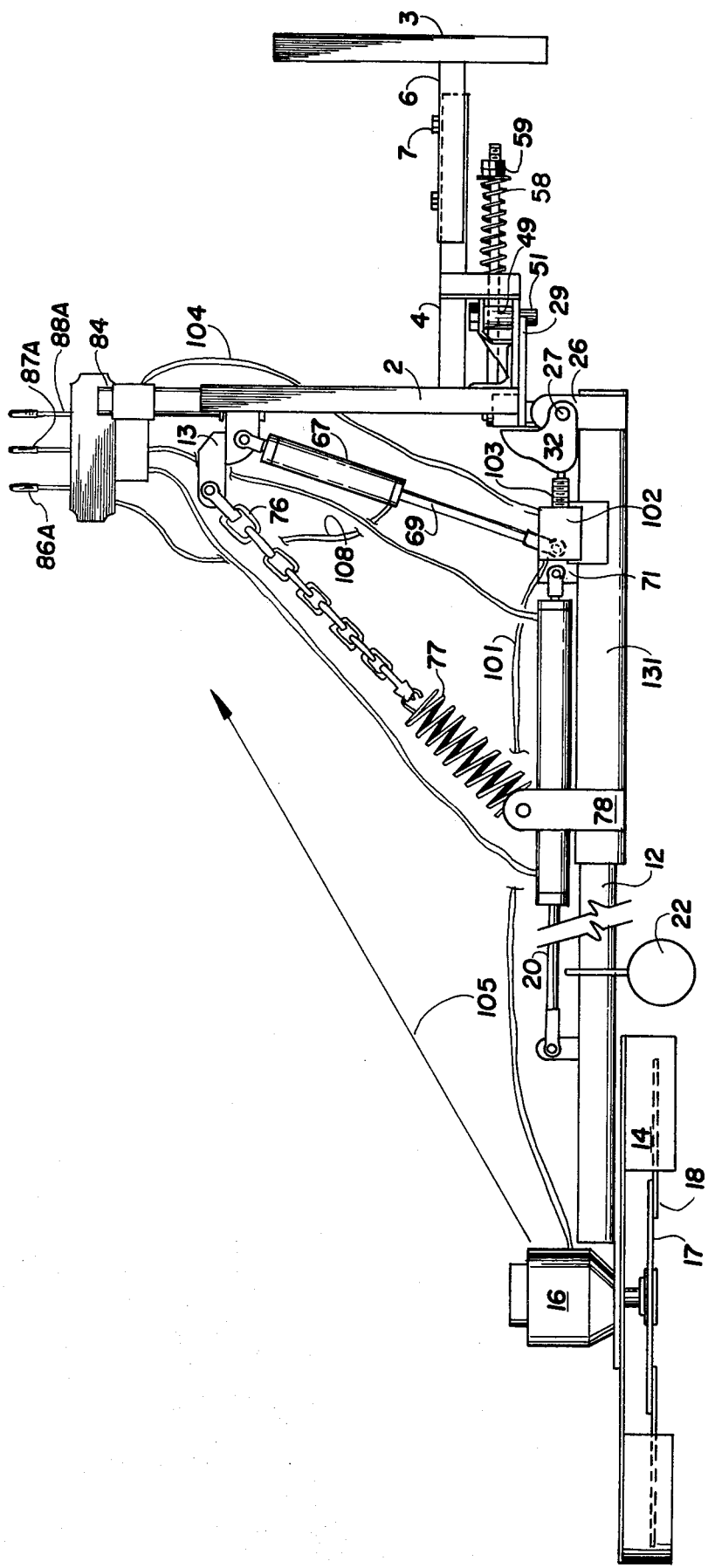
FIG. 3 is an elevational view of the embodiment shown in FIG. 1.

The mower assembly includes a shroud 14 adapted to receive a fluid power motor 16 to drive a rotating blade 17 shown in FIG. 3. As is known in the art, an aperture 18 is provided in the downwardly extending sides of shroud 14 for emission of cuttings from the mower.

A hydraulic cylinder 19 is provided and carried by arm 13, as shown, and includes an extensible power shaft 20 connected to sliding arm 12 by means of a fastener assembly 21 so that operation of cylinder 19 extends and retracts sliding arm 12 and mower assembly 9.

A runner 22, as described hereinafter, can be carried on sliding arm 12 and fastened thereto by means of a bracket 23.

Arm 13 is pivoted for vertical movement and in this connection includes spaced aligned brackets 26 at the ends thereof as shown in FIG. 4, which includes aligned apertures 26A adapted to receive a pivot pin 27. A sleeve 28 is provided and is connected to a plate 29 (which provides part of the release mechanism described hereinafter) by means of a post 31 and pin 27 is received through aperture 28A of sleeve 28 so brackets 26 pivot about pin 27 while the pin is retained in sleeve 28.

Sleeve 28 is secured, as previously described, between brackets 26 by means of a pin 27 where a cam 32, as described hereinafter, is carried on pin 27. A heywey 27A is provided in sleeve 28, and a hey (not shown) can be provided to be received in heyway 27A and a cooperative heyway in pin 27 (not shown) so that cam 32 does not move with arm 13, as described hereinafter.

Plate 29 carries an upstanding post 33 having a cooperative aperture 34 to be utilized as described hereinafter. Plate 29 includes sloping ends 29A and a notch 29B to provide a "breakaway" to release pivotal movement of arm 13 in a horizontal plane as described hereinafter.

Plate 29 and post 33 are connected to arm 2 of yoke 1 by means of a sleeve 36 carried by arm 2 and adapted to receive post 33. A pin 37 is inserted through aperture 34 of post 33 after post 33 is received within sleeve 36. In this position, the assembly including sleeve 28, plate 29, is retained in sleeve 36 by post 33 and the assembly is rotatable in a horizontal plane. Therefore, arm 13, which is carried by sleeve 28, is also rotatable in a horizontal plane.

One feature of the present invention as shown in the embodiment represented in the Figures is the provision of a breakaway arrangement mentioned above and described hereinafter.

Specifically, arm 2 includes a bracket assembly 41 extending laterally behind arm 2 where second spaced brackets 42, 43 are provided as shown and include cooperative aligned apertures 44 provided to receive a bolt 46 secured by a nut 47.

A pivot arm assembly 48 is provided and includes an upstanding sleeve 49 having an aperture 51 where sleeve 49 is received between brackets 42, 43 and bolt 46 is inserted through apertures 44 of brackets 42, 43 and aperture 51 of pivot arm 48 so pivot arm 48 is freely rotatable about bolt 46 in a horizontal plane. A post 50 is advantageously provided on arm 48 and positioned, as shown in FIG. 4, to be received in notch 29B when pivot assembly 48 is rotated to a position that post 51 can be so received. A horizontal sleeve 52 is provided at the end of pivot assembly 48 opposite sleeve 49 and includes a horizontally oriented aperture 53.

A second bracket 54 extends laterally from arm 2, as shown and includes an aperture 56 adapted to receive a bolt 57. Bolt 57 is adapted to carry a compression spring 58 and has adjusting nuts 59. When in the assembled form, bolt 56 is inserted through aperture 53 of sleeve 52 so that one end of sleeve 52 engages a washer 61 carried on bolt 57 in front of compression spring 58 and the free end of bolt 57 extends through aperture 53 of pivot assembly 48 and aperture 56 of bracket 54 and is adapted to receive a nut 62. Thus, in this assembly, the compression spring 58 urges sleeve 52 toward bracket 54 and likewise because of the pivot assembly, urges post 51 into notch 29B.

Referring again to FIGS. 1 and 3, arm 2 also carries a bracket 66. A power source, for example a hydraulic cylinder 67 as known in the art, is connected to bracket 6 by means of a saddle 68. Hydraulic cylinder 67 includes a power shaft 69 connected by means of a saddle 72 to a bracket 71, carried by arm 13, so that bracket 26 of arm 13 pivots about pin 27 and responds to movement of shaft 69 within hydraulic cylinder 67 to move arm 13 in a vertical plane. Bracket 66 also carries a saddle 74 connected to chain 76 connected, in turn, to a spring 77 which is connected to arm 13 by a pin and bracket assembly 78 carried by arm 13 to provide an upward bias for arm 13 when the mower is in operation, as described hereinafter.

Arm 2 further carries a post 81 adapted to receive an angle bracket 82 where a second post 83 is carried by bracket 82 to retain a control device 84 to operate the apparatus illustrated in FIGS. 1 through 4.

Control 84 includes three valve members 86, 87, 88, as shown in FIGS. 1 through 5 where the valves are operated by levers 86A, 87A, and 88A respectively.

As previously discussed, all of the apparatus of the embodiment of the present invention as shown in the drawings can be operated hydraulically. Referring to FIG. 5, a source of hydraulic fluid including a pump 39 (FIG. 5) which is powered by the tractor (not shown) and a fluid reservoir 89A is provided where pump 89 and reservoir 89A can be the hydraulic system of the tractor. A return fluid conduit 91 is provided from control 87 to the hydraulic fluid reservoir 89A and a pressurized fluid supply conduit 110 is provided to supply pressurized fluid to the elements of the assembly.

Referring to FIGS. 1 through 5, blade 17 of mower assembly 9 is driven by a fluid motor 16 powered by pressurized fluid from pump 89. Valve 88 is controlled by valve operator 88A and, as shown, can be of the piston type including a piston 88B positioned by operator 88A to align a valve part 88C to permit fluid flow when operation of motor 16 is desired. In accordance with an optional feature of the present invention a conduit 104 is connected to the outlet of valve 88 and connects to a second valve 102 controlled by an actuator 103. Valve 102 can be a spring biased piston valve where actuator 103, which is positioned by cam 32, works against a spring 102C to hold a part 102B in open position so long as actuator 103 is in contact with the lower portion of cam 32. As arm 13 is raised, cam 32 being fixed, actuator 103 rides along the cam surface.

As previously described, cam 32 includes irregular cam surfaces 32A and 32B so that, as arm 13 is pivoted upwardly, actuator 103 remains in contact with surface 32A until an altitude is reached where actuator 103 engages surface 32B and spring 102C closes valve 102 to terminate operation of motor 16. This particular feature of the present invention can be included as a safety measure to prevent operation of the mower when arm 13 is inclined about a pre-selected angle determined by the intersection of cam surfaces 32A and 32B.

The outlet from valve 102 is connected, by means of conduit 101 to motor 16. Thus, in the example shown, motor 16 will operate when valve 88 is actuated and then only where valve 102 is in operating position. In other embodiments, valve 102 can be eliminated where it is necessary to operate the mower at extended elevation.

As previously described, single acting hydraulic cylinder 67 is provided to raise arm 13. In accordance with one feature of the invention, cylinder 67 is adapted to raise arm 13 and arm 13 is lowered by its own weight but it will be recognized that a double-acting cylinder can be provided to raise and lower arm 13.

The power side of cylinder 67 can be connected by conduit 108 to the outlet of valve 86, which can be a piston valve having a dual port piston 86B operated by means of operator 86A between the position shown in FIG. 5 where pressurized fluid flows through part 86C to cylinder 67 to a second position (not illustrated) where return part 86D is aligned with conduit 108 and valve outlet 86E so fluid flows through conduit 108 from cylinder 67 and port 86D to outlet 86E communicating with fluid return 91 to reservoir 89A so that when fluid is returned, cylinder 67 is relaxed and arm 13 is lowered by its own weight.

A double-acting cylinder 19 is provided to extend and retract shaft 20 connected to telescoping arm 12 where arm 12, and mower assembly 9 are likewise extended and retracted by movement of shaft 19. Referring to FIG. 5, operation of cylinder 19 is controlled by valve 87 where operator 87 moves a piston valve member 87B to direct fluid flow through valve 87 to cylinder 19. In the example shown, valve member 87B is provided with two sets of cooperative fluid flow parts 87C and 87D. Cooperative fluid flow conduits 106 and 107 can be connected to valve 87 and opposite ends of cylinder 19 as shown. Likewise pressurized fluid conduit 110A and return fluid conduit 91A are connected to communicate with valve 87 as shown. The arrangement shown provides means, as known in the art, to secure operation of shaft 20 of cylinder 19 in a selected direction. For example, in the arrangement shown in FIG. 5, pressurized fluid is applied to conduit 106 while conduit 107 is open to the low pressure fluid return so shaft 20 moves outwardly with respect to cylinder 19. When operator 87A is activated to index parts 87A with conduits 106, 107, 110A and 91A, the converse situation exists. That is, pressurized fluid is applied to conduit 107 and conduit 106 is open to the fluid return so shaft 20 is moved into cylinder 19 and mower assembly is drawn toward its tractor.

In operation, the assembly shown in the Figures is attached to a tractor means of yoke assembly 1, where bolts are received through apertures 8 and secured to the tractor.

The appropriate connections are made to supply pressurized hydraulic fluid for operation of the device as described hereinbefore.

When the device is in operation, for example in an application where it is utilized to mow under a fence, the tractor can be driven in a path parallel to the fence. Devices in accordance with the present invention are particularly useful in such applications because they can be adapted so the outrigger arm 12, 13 is generally parallel with the surface to be mowed so that extension or retraction of mower assembly 9 does not substantially change the elevation of the mower assembly with respect to the surface to be mowed. The mower is in fully lowered position and shroud 14 extends beneath the lowermost edge of the fence with runner 22 riding over the surface of the ground.

The truncated ends provided on runner 22 facilitate the movement of runner 22. In this mode of operation some of the weight of arm 13 and mower assembly 9 is taken off runner 22 by proper selection of the length of chain 76. As previously described, chain 76 is connected to tension spring 77 which is connected to arm 13. The arrangement can be adjusted so that arm 13 effectively floats with minimum support by runner 22 and can further be adjusted so that runner 22 does not touch the ground except where there are irregularities in the surface. In applications where there are minimal irregularities in the surface, runner 22 can be eliminated and, likewise, the roller supports utilized in previous devices can also be eliminated.

In such applications, where the device is utilized to cut under fencing, and where the tractor follows a path parallel to the fence, it is necessary to avoid the fence posts supporting the fence. In accordance with one feature of the present invention, cylinder 19 can be utilized to extend and withdraw mower assembly 9 to avoid the fence posts.

In operation where the example of mower device shown in the Figures is carried on a moving tractor, the outrigger assembly could be substantially damaged if it inadvertently struck a fixed object such as a fence post, tree stump or partially buried large rock. In accordance with one feature of the present invention, the breakaway assembly including pivotable plate 29, which receives a spring-biased locking post 50 in a notch 29B is provided to release the outrigger assembly 12, 13, 14 for pivotal movement in a horizontal plane in the event any part of the outrigger assembly 12, 13, 14 strikes such a fixed object.

Figure 1:
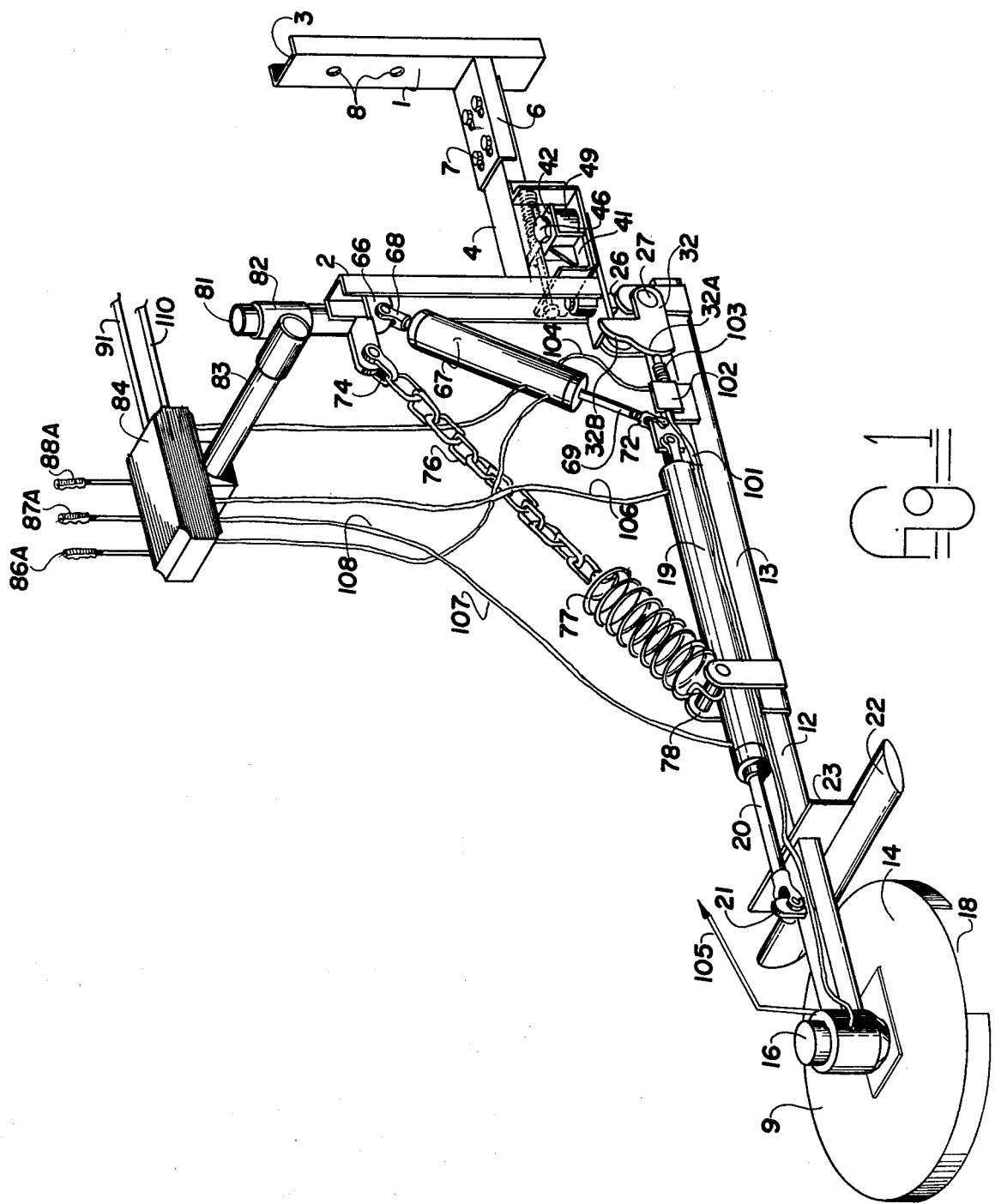
FIG. 1 is a perspective view of one arrangement in accordance with the present invention.
Figure 2:
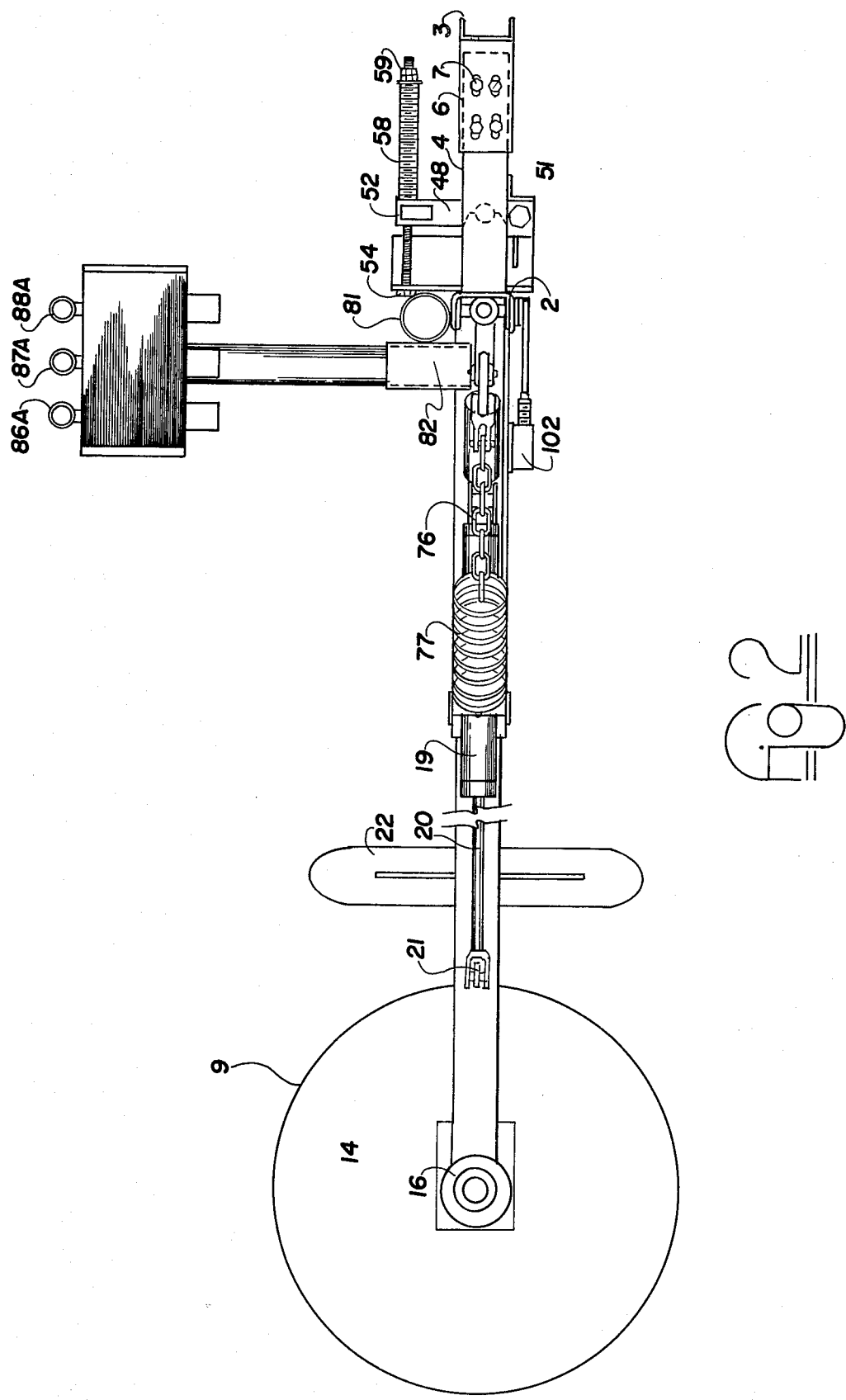
FIG. 2 is a plan view of the embodiment illustrated in FIG. 1.

Referring now to FIG. 6 which illustrates another arrangement in accordance with the present invention, the device illustrated is similar to the one illustrated in FIGS. 1–3 except that mower assembly 9 is connected to telescoping arm 12 by means of an arm 111, connected to mower assembly 9 for example by welding, where arm 111 is connected to arm 12 by a pivot pin 112 so that mower assembly 9 can be selectively pivoted in a vertical plane.

Advantageously, a generally vertically extending arm 113 is connected at one end to arm 111 and a pivot 112 is provided at the uppermost end adapted to receive the power shaft 114 of a hydraulic cylinder 116. Hydraulic cylinder 116 is connected to arm 113 by means of a pivot 112. Hydraulic cylinder 116 is supplied with pressurized hydraulic fluid by means of conduits 117 and 118, to move shaft 114 as is known in the art. Conduits 117 and 118 are connected to a valve (not shown) operated by handle 119 to move power shaft 114 in cylinder 116.

Advantageously, movement of shaft 114 pivots arm 113 through an angle A to pivot mower assembly 9 accordingly so that mower assembly 9 can be tilted in a vertical plane to incline shroud 114 parallel to a non-level surface, or even vertical surface.

The latter feature advantageously allows the mower to be cooperatively positioned as shown schematically in FIGS. 7A–C to mow in awkward positions. Specifically, as shown in FIG. 7A, an offset elevated surface 121A can be mowed where yoke 122, carried by a tractor (not shown) moves over surface 121 where outrigger 123 is elevated and mower assembly 124 is horizontally set to cut surface 121A.

As illustrated in FIG. 7B, a downwardly inclined surface 126A can be mowed where a tractor (not shown) moves along surface 126 with outrigger 123 extended outwardly from yoke 121 and mower 124 downwardly inclined parallel to surface 126A.

Finally, in another example of use of the arrangement shown in FIG. 7C, an upwardly inclined surface 127A is mowed where a tractor (not shown) moves along surface 127 with outrigger 123 extended and mower 124 upwardly inclined to mow surface 127A.

The present invention can further be adapted as shown schematically in FIG. 7D, where mower 124 can be adapted to vertical orientation to, for example, trim hedges 128 as yoke 122 moves over the surface 129.

The invention claimed is:

1. A relatively low profile, light weight, versatile mower device to be attached to a tractor or the like for movement therewith to cut grass, brush, or the like, comprising an elongate generally straight outrigger assembly, including extensible-retractible arm means for carrying a mower assembly adjacent a relatively outermost end thereof; motive means for extending and retracting said arm means and thereby to move such mower assembly relative to such tractor; outrigger assembly retaining bracket means securable to such tractor at a relatively low location on the latter for supporting said outrigger assembly at a relatively innermost end thereof from such tractor with said arm means extending generally laterally outwardly from such tractor; and first pivot means located at a relatively low location with respect to the tractor body for connecting said outrigger assembly to said bracket means to permit said arm means selectively to pivot in a vertical plane to position said mower means at selected attitude relative to horizontal, said motive means including means for extending and retracting said arm means in a substantially straight direction from the location at which said outrigger assembly is supported on said bracket means.

2. The invention of claim 1, said arm means comprising plural parallel substantially coextensive arms, one being slidable with respect to the other thereby to extend and to retract the same.

3. The invention of claim 1, said bracket means comprising a yoke assembly for securing said outrigger assembly at said first pivot means to the tractor at a location beneath the tractor body.

4. The invention of claim 1, further comprising actuator means for extending and retracting said arm means and further actuator means for selectively moving said outrigger assembly in a vertical plane.

5. The invention of claim 1, further comprising support means for supporting said outrigger assembly with such mower assembly in predetermined position with respect to the ground.

6. The invention of claim 5, said support means comprising a resilient means for holding said outrigger assembly above the ground thereby to allow said outrigger assembly and such mower assembly substantially to float above the ground.

7. The invention of claim 6, further comprising runner means for spacing such outermost end of said arm means away from the ground and said support means including means for supporting said outrigger assembly to make the same nearly weightless with respect to said runner means when said outrigger assembly is positioned in a substantially horizontal attitude.

8. The invention of claim 1, further comprising automatic control means for controlling operation of such mower assembly in response to the position of said outrigger assembly.

9. The invention of claim 8, said control means comprising means for terminating operation of such mower assembly when said outrigger assembly is positioned vertically above a predetermined angle with respect to horizontal.

10. The invention of claim 9, said control means comprising a cam and a cam follower actuator, the same being movable with respect to each other as said outrigger assembly is moved to different angular elevations with respect to horizontal.

11. The invention of claim 1, further comprising mower assembly connecting means for connecting such mower assembly to said outermost end of said arm means.

12. The invention of claim 11, said mower assembly connecting means comprising mower pivot means for permitting pivotal movement of such mower assembly with respect to said arm means.

13. The invention of claim 12, further comprising remote control actuator means for selectively pivoting such mower assembly on said mower pivot means with respect to said arm means.

14. The invention of claim 13, further comprising remote control actuator means for pivoting said outrigger assembly on said first pivot means.

15. The invention of claim 13, wherein such mower assembly includes a generally flat rotating mower blade adapted to be rotated in a selected plane, and said mower assembly connecting means and remote control actuator means being cooperative to pivot such mower assembly about said mower pivot means to position the plane of rotation of such mower blade in spaced parallel relation from a surface to be mowed.

16. The invention of claim 1, said motive means comprising means for moving said arm means while maintaining the latter relatively parallel to the ground and, thus, while maintaining such mower assembly relatively proximate the ground.

17. The invention of claim 1, further comprising second pivot means for connecting said first pivot means to said bracket means, said second pivot means including releasable retainer means for preferentially retaining said arm means in a first position extending laterally outwardly from such tractor, said releasable retainer means including release means for releasing said arm means for rotation in a horizontal plane about said second pivot means when said outrigger assembly strikes an obstruction.

18. The invention of claim 1, further comprising second pivot means for connecting said first pivot means to said bracket means, including a vertically open sleeve supported by said bracket, pivot connector means for pivotally connecting said outrigger assembly to said sleeve for horizontal pivoting movement of said outrigger assembly with respect to said bracket means, said pivot connector means including a pivot plate having a generally V-shape end with a cooperative pin receiving notch in the crotch of the V-shape end, downwardly extending outrigger connection means adjacent the end of said pivot plate opposite the V-shape end for connecting said outrigger assembly to said pivot plate to hold the same with respect to each other in at least one fixed directional constraint, and upwardly extending post means in generally fixed aligned relation with said connection means and received in said sleeve means for holding said pivot connector means and, thus, said outrigger assembly in fixed pivotal relation to said sleeve means and bracket means to permit pivoting of said outrigger assembly in a horizontal plane, and spring-biased pin means carried by said bracket means to be received in said pivot plate notch for preferentially aiming said pivot plate in a disposition to hold said outrigger means in a position extending laterally from such tractor, said spring-biased pin means including spring-biasing means responsive to abrupt movement of said outrigger assembly for releasing said pivot means from said pivot plate notch thereby to permit said outrigger assembly then to move freely in a horizontal plane.

19. A mower device to be attached to a tractor for movement therewith including:
    (a) elongate generally straight outrigger means including extensible-retractable arm means adapted to carry selected mower means adjacent the outermost end thereof;
    (b) motive means to extend and retract said arm means;
    (c) outrigger retaining bracket means to be secured to said tractor and adapted to carry said outrigger means where said outrigger means is carried so that said arm means extends laterally outwardly from said tractor at a location beneath the body of said tractor; and,
    (d) first pivot means located at an elevation beneath the the tractor body connecting said outrigger means to said bracket means to permit said arm means to selectively pivot in a vertical plane to position said mower means at selected attitude relative to horizontal.

20. The invention of claim 19 wherein said mower means is connected to said outrigger means by mower pivot means to permit said mower means to be pivoted in a vertical plane.

21. The invention of claim 20 wherein said mower means includes a generally flat rotating mower blade adapted to be rotated in a selected plane, said mower pivot means includes means for pivotally mounting said mower means relative to said outrigger means to permit pivoting of said mower assembly about said mower pivot means to position the plane of rotation of said mower blade in spaced parallel relation from a surface to be mowed.

22. A mower device to be attached to a trailor for movement therewith including:
    (a) elongate generally straight outrigger means including extensible-retractable arm means adapted to carry selected mower means adjacent the outermost end thereof in spaced relation above a surface to be mowed;
    (b) motive means to extend and retract said arm means;
    (c) outrigger retaining bracket means to be secured to said tractor and adapted to carry said outrigger means where said outrigger means is carried so that said arm means extends laterally outwardly from said tractor at a location beneath the body of said tractor;
    (d) first pivot means located at an elevation beneath the tractor body and connected to said outrigger means to said bracket means to permit said arm means to selectively pivot in a vertical plane to position said mower means at selected attitude relative to horizontal; and
    (e) second pivot means located beneath the elevation of said tractor body connecting said first pivot means to said bracket means including:
        (i) vertically open first sleeve means carried by said bracket;
        (ii) pivot connector means including a pivot plate having a generally "V" shaped end with a cooperative pin receiving notch in the crotch of the "V" shaped end, carrying downwardly extending outrigger connection means adjacent the end of the pivot plate opposite the "V" shaped end, upwardly extending first post means in generally aligned relation with said connector means where said first post means is adapted to be pivotably received in said first sleeve means, whereby said outrigger is connected to said bracket by said first post means and is pivoted thereabout in a horizontal plane;
        (iii) spring-biased pin means carried by said bracket means to be received in said pivot plate notch to preferentially aim said pivot plate in a disposition wherein said outrigger means extends laterally from said tractor and where abrupt movement of said outrigger means releases said pin means from said pivot plate notch whereby said outrigger means is free to move in a horizontal plane.

23. The invention of claim 22 wherein lift means are connected between said bracket means and said outrigger means to selectively pivot said outrigger means about said first pivot means to selectively raise and lower said outrigger means.

24. The invention of claim 22 including spring-bias means connected between said outrigger means and said bracket means to support said outrigger means at a selected angular orientation relative to the surface to be mowed.

25. A mower device to be attached to a tractor for movement therewith including:
    (a) elongate generally straight outrigger means including extensible-retractable arm means adapted to carry selected mower means adjacent the outermost end thereof in spaced relation above a surface to be moved;
    (b) motive means to extend and retract said arm means;
    (c) outrigger retaining bracket means to be secured to said tractor and adapted to carry said outrigger means where said outrigger means is carried so that said arm means extends laterally outwardly from said tractor at a location beneath the body of said tractor;
    (d) first pivot means located at an elevation beneath the tractor body and connected to said outrigger means to permit said arm means to selectively pivot in a vertical plane to position said mower means at selected attitude relative to horizontal; and
    (e) second pivot means connecting said first pivot means to said bracket means including releasable retainer means to preferentially retain said arm means in a first position extending laterally outwardly from said tractor and to release said arm means for rotation in a horizontal plane about said pivot when said arm means strikes an obstruction.

* * * * *